(12) United States Patent
Herz (10) Patent No.: US 7,519,507 B1
(45) Date of Patent: Apr. 14, 2009

(54) SYSTEM, METHOD, AND COMPUTER PROGRAM PRODUCT FOR QUANTITATIVE VIDEO BENCHMARKING

(75) Inventor: William S. Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 232 days.

(21) Appl. No.: 11/509,997

(22) Filed: Aug. 24, 2006

(51) Int. Cl.
*G06F 19/00* (2006.01)
(52) U.S. Cl. .................... 702/182; 386/100; 345/473
(58) Field of Classification Search ............. 702/182, 702/183–185, 188; 368/100; 345/473
See application file for complete search history.

(56) References Cited

U.S. PATENT DOCUMENTS 5,122,873 A * 6/1992 Golin .................. 375/240.23

OTHER PUBLICATIONS

U.S. Appl. No. 11/478,927, filed Jun. 30, 2006.
U.S. Appl. No. 11/510,429, filed Aug. 24, 2006.

* cited by examiner

*Primary Examiner*—Edward Raymond
(74) *Attorney, Agent, or Firm*—Zilka-Kotab, PC (57) ABSTRACT

A system, method, and computer program product are provided for quantitatively gauging video processing. In use, at least one quantitative aspect and at least one qualitative aspect of video processing of a processor are identified. To this end, the video processing of the processor may be gauged based on the quantitative and qualitative aspects.

19 Claims, 6 Drawing Sheets

SYSTEM, METHOD, AND COMPUTER PROGRAM PRODUCT FOR QUANTITATIVE VIDEO BENCHMARKING

FIELD OF THE INVENTION

The present invention relates to benchmarking, and more particularly to video benchmarking.

BACKGROUND

Benchmarking typically refers to a test used to compare various aspects of computer-related hardware and/or software. Trade magazines and other organizations have developed various benchmark tests, which may be used when reviewing a class of products. One particular type of benchmarking is three-dimensional graphics benchmarking which tests different aspects of a graphics processor and, in particular, the manner in which the graphics processor processes graphics information. This type of benchmarking is automated, quantifiable, and reproducible. It is also well understood and has been in use for years.

Another particular type of benchmarking is video benchmarking. Video benchmarking tests different aspects of a graphics processor and, in particular, the manner in which the graphics processor processes video, performs digital versatile disk (DVD) decoding, etc. Unlike three-dimensional graphics benchmarking, video benchmarking is problematic since it is highly subjective in nature, and typically involves a gamut of natural images, etc.

In the same way that there is currently tremendous value in three-dimensional graphics benchmarking, similar value would apply to video benchmarks, if a quantifiable and/or automated video benchmark could be created. There is thus a need for overcoming these and/or other problems associated with the prior art.

SUMMARY

A system, method, and computer program product are provided for quantitatively gauging video processing. In use, at least one quantitative aspect and at least one qualitative aspect of video processing of a processor are identified. To this end, the video processing of the processor may be gauged based on the quantitative and qualitative aspects.

DETAILED DESCRIPTION

Figure 1:
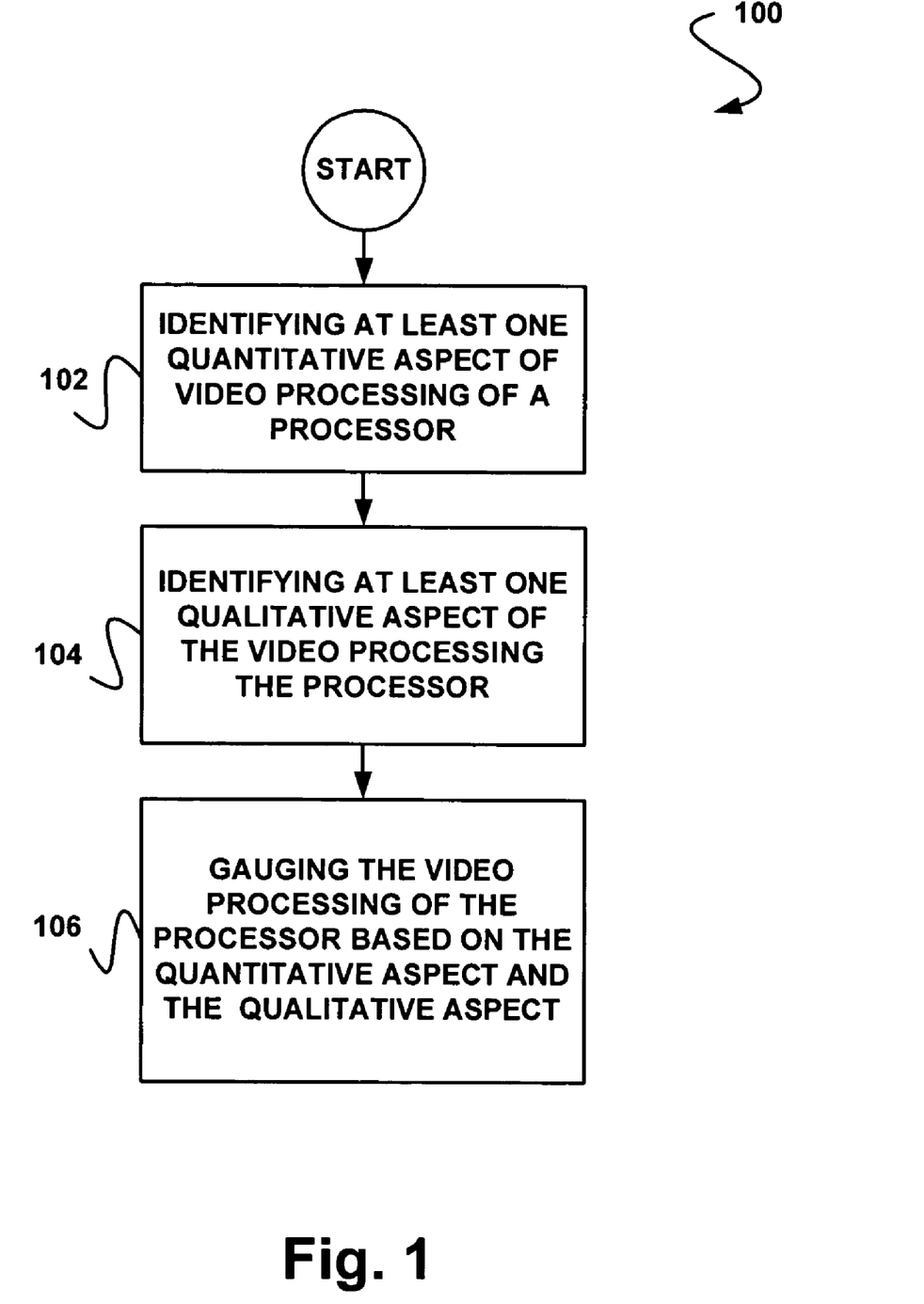
FIG. 1 shows a method for quantitative video benchmarking, in accordance with one embodiment.

FIG. 1 shows a method 100 for quantitative video benchmarking, in accordance with one embodiment. As shown, at least one quantitative aspect of video processing of a processor is identified. See operation 102. In one embodiment, the processor may include a graphics processor capable of video processing. In other embodiments, the processor may include a video processor or an audio processor. In the context of the present description, however, the processor may include any hardware capable of video or audio processing.

Still yet, in various embodiments, the video processing may involve gamma correction, motion estimation or compensation, decompression, color space control, brightness, saturation, color temperature correction, sharpening, overlay processing, scaling, encoding, de-interlacing, up/down scaling, digital versatile disk (DVD) decoding, etc. It should be noted that the foregoing examples of video processing are set forth for illustrative purposes only and should not be construed as limiting in any manner. Of course, the video processing may involve any processing that involves any type of video content.

In various embodiments, the quantitative aspect may relate to any parameter associated with the aforementioned forms of video processing. Still yet, such parameters may optionally be associated with a particular pixel. Thus, in one embodiment, the quantitative aspect may include a value of an associated parameter (e.g. a brightness, a color component magnitude, etc.) corresponding to a particular pixel, etc. Of course, the identification of such present aspect may involve an automatic measurement, a manual input of an appropriate value, and/or any other identification technique that results in making the quantitative aspect available for gauging purposes.

More information regarding an example of use of such a quantitative aspect will be set forth in greater detail during reference to subsequent figures. It should be noted, however, that in the context of the present description, the quantitative aspect may include any aspect associated with the video processing which may be quantitatively measured.

With continuing reference to FIG. 1, at least one qualitative aspect of the video processing of the processor may also be identified. See operation 104. In use, the identification of the present aspect may be accomplished by a human user inputting observations (e.g. that a color is less bright, that a quality of the video is better or worse, etc.), and/or using any other identification technique that results in making the qualitative aspect available for gauging purposes. In the context of the present description, the qualitative aspect may refer to any observation that is more difficult to quantitatively measure, with respect to the quantitative aspect.

To this end, the video processing of the processor may be gauged based on both the at least one quantitative aspect and the at least one qualitative aspect. See operation 106. By this feature, a qualitative gauging of the video processing may be improved by taking into account at least one quantitative aspect. Of course, in other embodiments, any one or more of the techniques described herein may be applied in the context of gauging audio/video or strictly audio processing of the processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
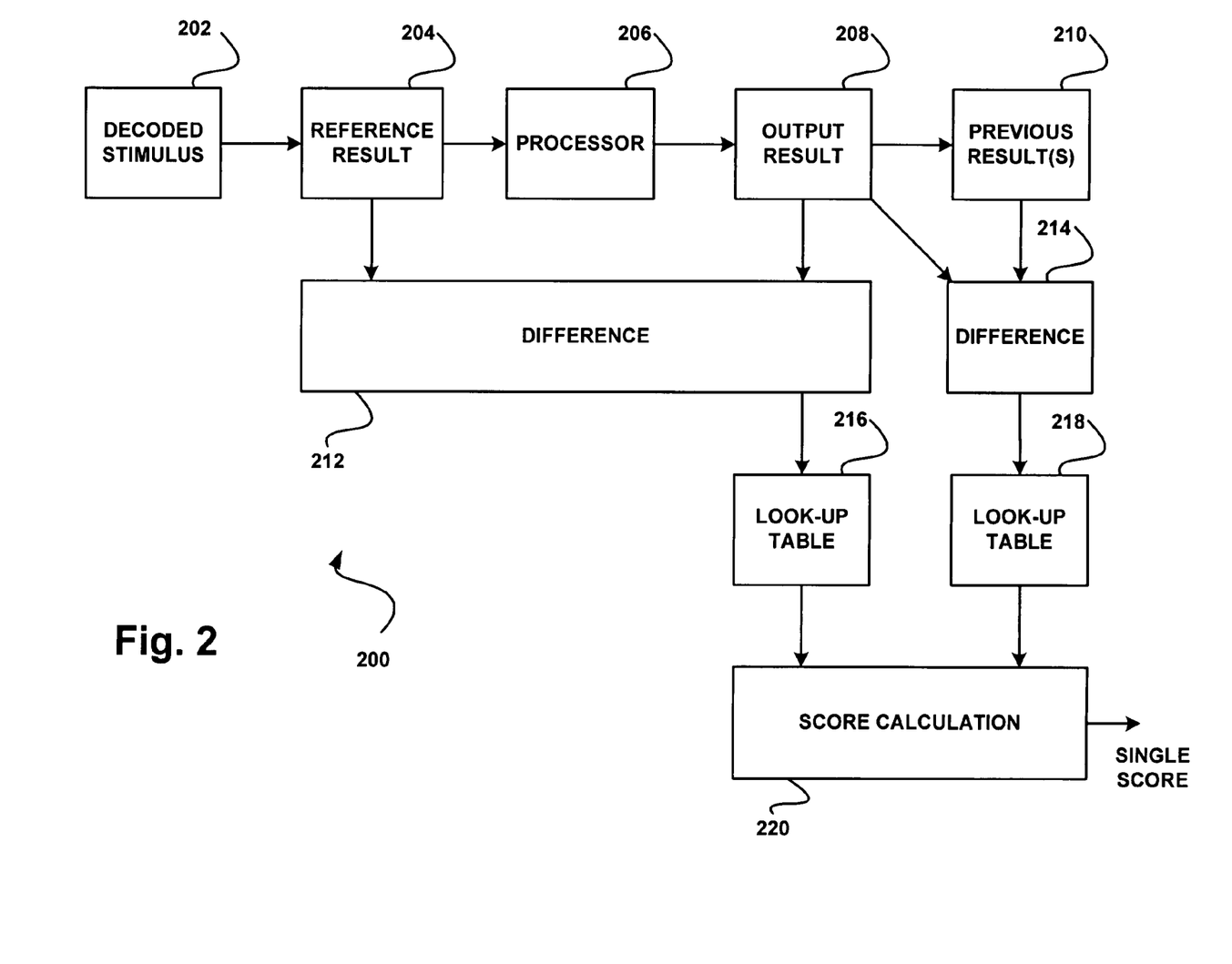
FIG. 2 shows a system for quantitative video benchmarking, in accordance with one embodiment.

FIG. 2 shows a system 200 for quantitative video benchmarking, in accordance with one embodiment. As an option, the present system 200 may be implemented to carry out the method 100 of FIG. 1. Of course, however, the system 200 may be implemented in any desired environment. For example, the system 200 may be implemented without incorporating any qualitative benchmarking. It should also be noted that the previous definitions apply in the context of the description of the present figure.

As shown, a stimulus 202 is provided in a decoded format for the purpose of being processed by a particular processor 206. Such stimulus 202 may, in one embodiment, include one or more frames of frame content and/or components thereof (e.g. one or more pixels of pixel content, line content, etc.).

As an option, the stimulus 202 and/or portions thereof may be specifically selected by virtue of their ability to test for a predetermined video processing aspect, etc. For example, in one embodiment, a different stimulus 202 may be provided for every combination of video processing aspects to be gauged. In an embodiment where a single stimulus 202 is capable of testing different video processing aspects, a first portion of the stimulus 202 (e.g. one or more frames, pixels, etc.) may be suited for gauging a first video processing aspect, a second portion of the stimulus 202 may be suited for gauging a second video processing aspect, and so forth. Thus, a test may be provided for resolving both aspects, or at least not inadvertently damaging a pixel(s) via one aspect as a result of enhancing another pixel(s) via another aspect.

In one embodiment, a pre-processed form or version of the stimulus 202 may serve as a reference, or reference result 204, for reasons that will soon become apparent. Of course, in other embodiments, the reference result 204 may take the form of any reference representing an ideal (or at least better) version of an output of the processor 206.

In operation, the stimulus 202 may be processed by the processor 206 to generate an output result 208. As mentioned earlier, the processing performed by the processor 206 may include any video processing. To this end, the output result 208 may be compared to the reference result 204 to identify a difference 212 which may be optionally analyzed.

In one embodiment, such difference 212 may relate to a difference in one or more particular pixels. In other embodiments, the difference 212 may relate only to a portion of display content that was intended to be subjected to the video processing. In still additional embodiments, the difference 212 may relate to a portion of display content that was not intended to be subjected to the video processing (but nevertheless was subjected to the processing).

In use, the difference 214 may be identified and even analyzed in any desired manner. For example, one or more filters may be used for such purpose. More information regarding the operational use of such filter(s) will be set forth hereinafter during the description of subsequent figure in the context of an illustrative example of use.

To this end, a score may be identified utilizing a look-up table 216. Specifically, in one embodiment, the difference 212 may be utilized as an input and/or pointer to a particular score that is predetermined to be representative of the difference 212 at hand, the manner in which they are different. For instance, an analysis of the difference 212 may involve a standard deviation or filter analysis run in 1-3 dimensions, a frequency analysis, etc.

As an option, more than one difference 212 may be identified/analyzed for a predetermined number of pixels (which, again, may be selected by virtue of their ability to test for one or more predetermined video processing aspects, etc.). For example, a plurality of differences (each relating to different predetermined video processing aspects) and possibly an analysis thereof may exist for a plurality of different pixels. In such embodiment, an input to the look-up table 216 may involve a large number of values.

Optionally, the score resulting from the look-up table 216 may be considered a final result. In other embodiments, however, additional gauging may be performed utilizing archived results for feeding back results of previous stimulus processing associated with other processors, in a manner that will now be set forth.

Specifically, in such latter embodiments, the output result 208 may be compared to one or more archived previous results 210 to identify/analyze another difference 214. Again, the previous result(s) 210 may include results of video processing by a different processor (other than the processor 206, etc.) of a separate system. In some embodiments, such other processor(s) may include previous or legacy processing frameworks which may provide suitable comparisons in terms of technological development/improvement, etc.

To accomplish this comparison, various information associated with the output result 208 may first be used to identify the appropriate corresponding previous result(s) 210. For example, a stimulus, pixel location, etc. of the output result 208 may be identified to ensure that the appropriate corresponding previous result(s) 210 is used in the comparison. Still yet, as mentioned earlier, the difference 214 and possibly an analysis thereof may relate to a portion of display content that was and/or was not intended to be subjected to the video processing. To this end, any necessary pixel information from the previous result(s) 210 may be obtained to accomplish this.

Similar to the previous comparison, one or more differences 214 and possibly an analysis thereof may be utilized as an input and/or pointer to a particular score in another look-up table 218. By this feature, the scores may be the subject of a score calculation 220 which results in a single score that gauges at least one quantitative aspect of the video processing. Such score calculation 220 may involve a simple normalized sum of the scores, a specific relative weighting of the scores, and/or absolutely any other technique for combining the scores into a single score. Of course, an embodiment is also contemplated where the scores remain separate (e.g. without the score calculation 220, etc.) and are used for gauging in such form.

By this feature, the present system 200 may be adaptable by incorporating results from previous generations of processors, etc. In particular, the current output result 208 may be used later as an archived previous result 210 when gauging later generations of processors, etc. Of course, any other facet of the present system 200 (e.g. the look-up tables, score calculation, etc.) may be adapted over time.

In the embodiment of FIG. 2, a first comparison is carried out between the output result 208 and the reference result 204, and a second comparison is carried out between the output result 208 and the previous result(s) 210 whereby results of such comparisons are combined. In another embodiment, however, it is contemplated that, after at least one iteration of the processing of the stimulus, a single comparison may be carried out only between the output result 208 and a best previous result 210. In such latter embodiment, the output result 208 may thus be gauged by comparing the video processing of a current processor with that of a previous processor, independent of the reference result 204. Of course, any linear or non-linear comparison may be employed.

Further, while not shown in FIG. 2, at least one qualitative aspect may further be introduced into the score calculation 220. More information regarding such option will now be set forth with reference to FIG. 3.

Figure 3:
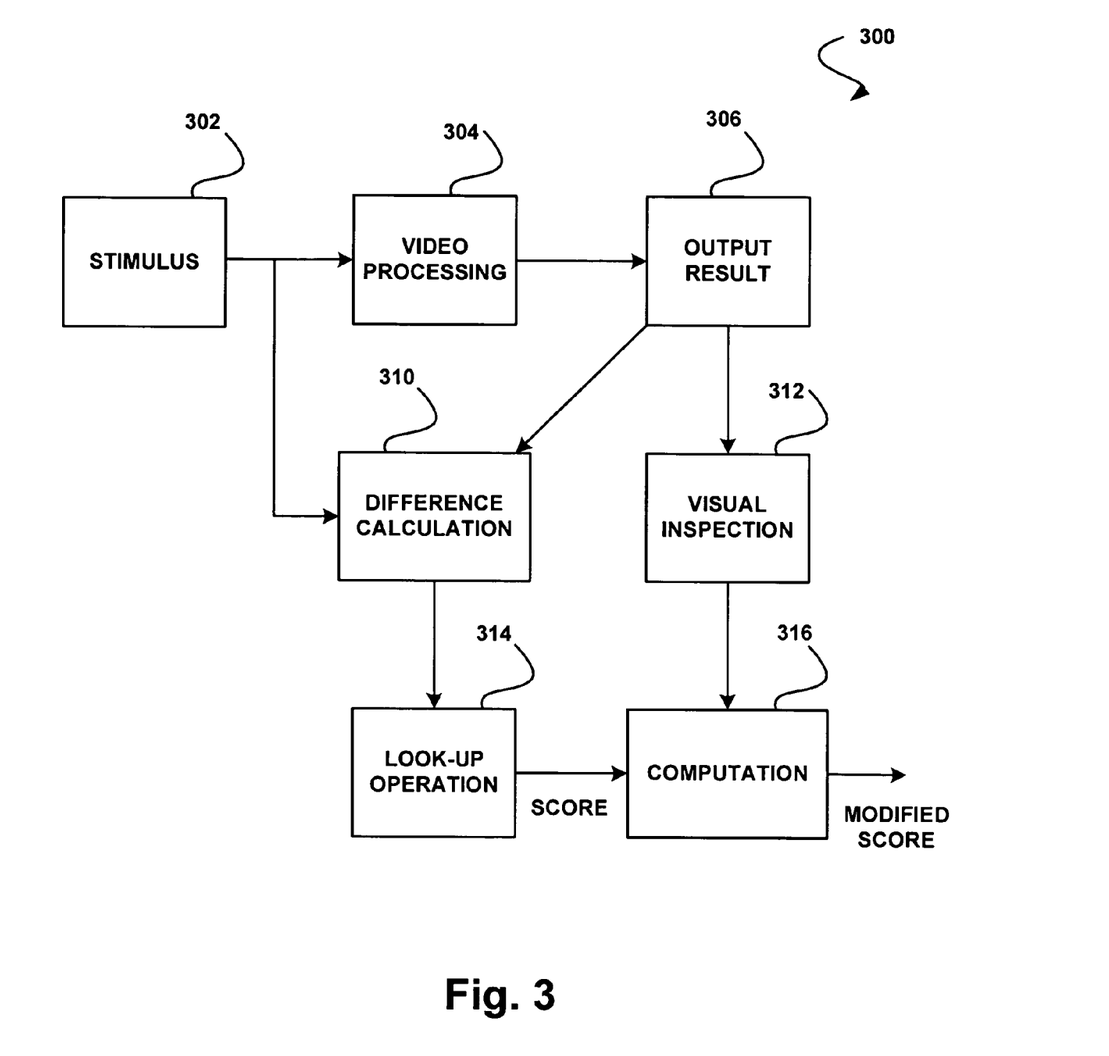
FIG. 3 shows a method for integrating quantitative and qualitative video benchmarking, in accordance with another embodiment.

FIG. 3 shows a method 300 for integrating quantitative and qualitative video benchmarking, in accordance with another embodiment. As an option, the present method 300 may be implemented to carry out the method 100 of FIG. 1 and possibly in the context of the system 200 of FIG. 2. Of course, however, the method 300 may be implemented in any desired environment. It should also be noted that the previous definitions apply in the context of the description of the present figure.

As shown, a stimulus 302 is input to a processor for video processing in operation 304 to generate an output result 306. Thus, the stimulus 302 and the output result 306 may be the subject of a difference calculation 310 and possible analysis. As set forth during reference to the system 200 of FIG. 2, the difference calculation 310 (and/or possible analysis of the difference) results in a difference measurement (and/or analysis result) that may, in turn, be used to identify a score via a look-up operation. See operation 314.

In addition, the output result 306 may also be the subject of a qualitative visual inspection. In one embodiment, this may be accomplished by a human user visually inspecting the output result 306 for inputting a qualitative observation. Such qualitative observation may take the form of something as simple as a general rating of 1-10, or something more elaborate such as a "grade" for each of a plurality of qualitative categories (e.g. sharpness, brightness, color, etc.).

Given such qualitative observation, the score resulting from the quantitative analysis may be modified using an appropriate computation. See operation 316. Such computation operation 316 may involve a specific relative weighting of the quantitative score/qualitative observation, subjecting the quantitative score to a factor indicative of the qualitative observation, and/or absolutely any other technique for incorporating the qualitative observation with the quantitative score.

While the incorporation of a previous result into the present scoring process is not incorporated in the present embodiment, it should be noted that an embodiment is contemplated where such previous result is indeed utilized, similar to the system 200 of FIG. 2. Still yet, in other embodiments, a separate score may be allocated to each of a plurality of pixels. In such embodiments, a color-coded map or the like may depict the pixel-by-pixel scoring trends for video benchmarking purposes, etc.

Figure 4A:
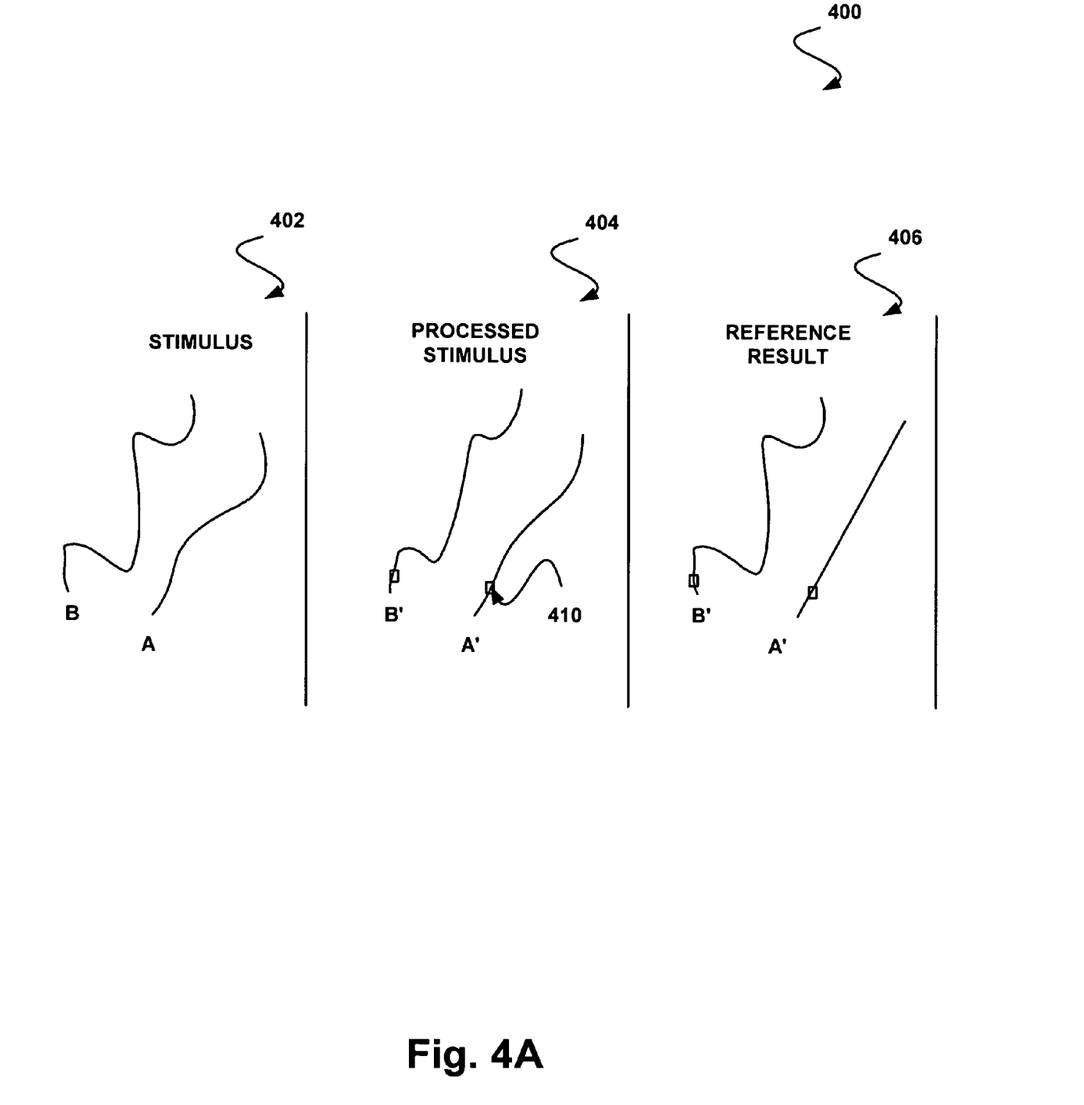
FIG. 4A shows an example of quantitative video benchmarking, in accordance with one embodiment.

FIG. 4A shows an example 400 of quantitative video benchmarking, in accordance with one embodiment. As an option, the present example 400 may be carried out in the context of the systems/methods of the previous figures. Of course, however, the example 400 may be implemented in any desired environment. It should also be noted that the previous definitions apply in the context of the description of the present figure.

In the context of the present example 400, a result of edge-enhancement video processing is gauged. Of course, such aspect of video processing is set forth for illustrative purposes only and should not be construed as limiting, since absolutely any type of video processing may be subjected to the current gauging technique.

In the present example 400, a first object A (e.g. a curve) is an intended target of an edge-enhancement algorithm, while a second object B (e.g. another curve) is not. Thus, as will become apparent, two errors may play a part in gauging the affect of the edge-enhancement algorithm. Specifically, a first error relates to an error in the video processing with respect to a first portion of display content (e.g. the first object A, etc.) that was intended to be subjected to the video processing. Further, a second error may relate to an error in the video processing with respect to a second portion of display content (e.g. the second object B, etc.) that was not intended to be subjected to the video processing. Of course, in addition to the mere presence of such errors, a degree of such errors may also play a part of any resultant scoring.

As shown, the stimulus 402 includes such objects in a form prior to processing. To provide a reference for gauging, a reference result 406 is provided. As set forth in previous embodiments (e.g. see, for example, FIGS. 2-3, etc.), the stimulus 402 may include a "golden" reference, whereby the stimulus 402 and the reference result 406 may be the same entity. However, in the present embodiment, the reference result 406 may include an archived previous result [e.g. see, for example, the previous result(s) 210 of FIG. 2, etc.], thereby providing a best historic result provided by previous processing frameworks, etc. In other embodiments, the reference result 406 may include an idealized algorithmic result of a mathematical model, a model not bound by hardware computation capacity, etc.

Note that, in reference result 406, the first object A is edge-enhanced by the edge-enhancement algorithm so as to reflect a straight line, while the second object B is left untouched. With continuing reference to FIG. 4A, the processed stimulus 404 is shown to include the first object A after being edge-enhanced to a certain extent, while the second object B is also inadvertently subjected to the edge-enhancement algorithm.

To gauge the video processing that resulted in the processed stimulus 404, relevant parameter values at one or more pixels 410 associated with the reference result 406 and the processed stimulus 404 may be compared. In one embodiment, this may be accomplished utilizing at least one filter. Specifically, one or more filters may be used to filter all but the values relevant to the above comparison. For example, in a situation where there is a deviation of pixels in a horizontal direction, a horizontal filter may be used to focus on horizontally situated pixels for ascertaining a horizontal difference. Similar filters may be used for vertical and/or temporal differences, etc.

Thus, in various embodiments, a technique may provide a video stimulus and capture a result of the video being decoded, processed, displayed, etc. Such result may then be compared to the original video and/or any other result versions with correlated quality assignments. In one embodiment, specific frames and pixels of the stimulus may be chosen as indicative of success or failure of quality. The resultant frames and pixels may then be compared to a reference or ideal result, as well as a variety of accumulated results.

By intelligently extracting specific pixels of interest, the technique may run a variety of filters (e.g. horizontal, vertical, temporal, etc.) to identify an error and derive a degree of the error, relative to the reference and/or previously benchmarked content. By the same token, predicted poor quality results may also be utilized to calibrate a degree of a lack of quality. Still yet, any desired qualitative benchmarking may optionally be incorporated with the gauging process. Thus, an automated tool for video quality assessment may be provided with a reproducible and quantitative measure reduced to an objective analysis and scoring technique.

Figure 4B:
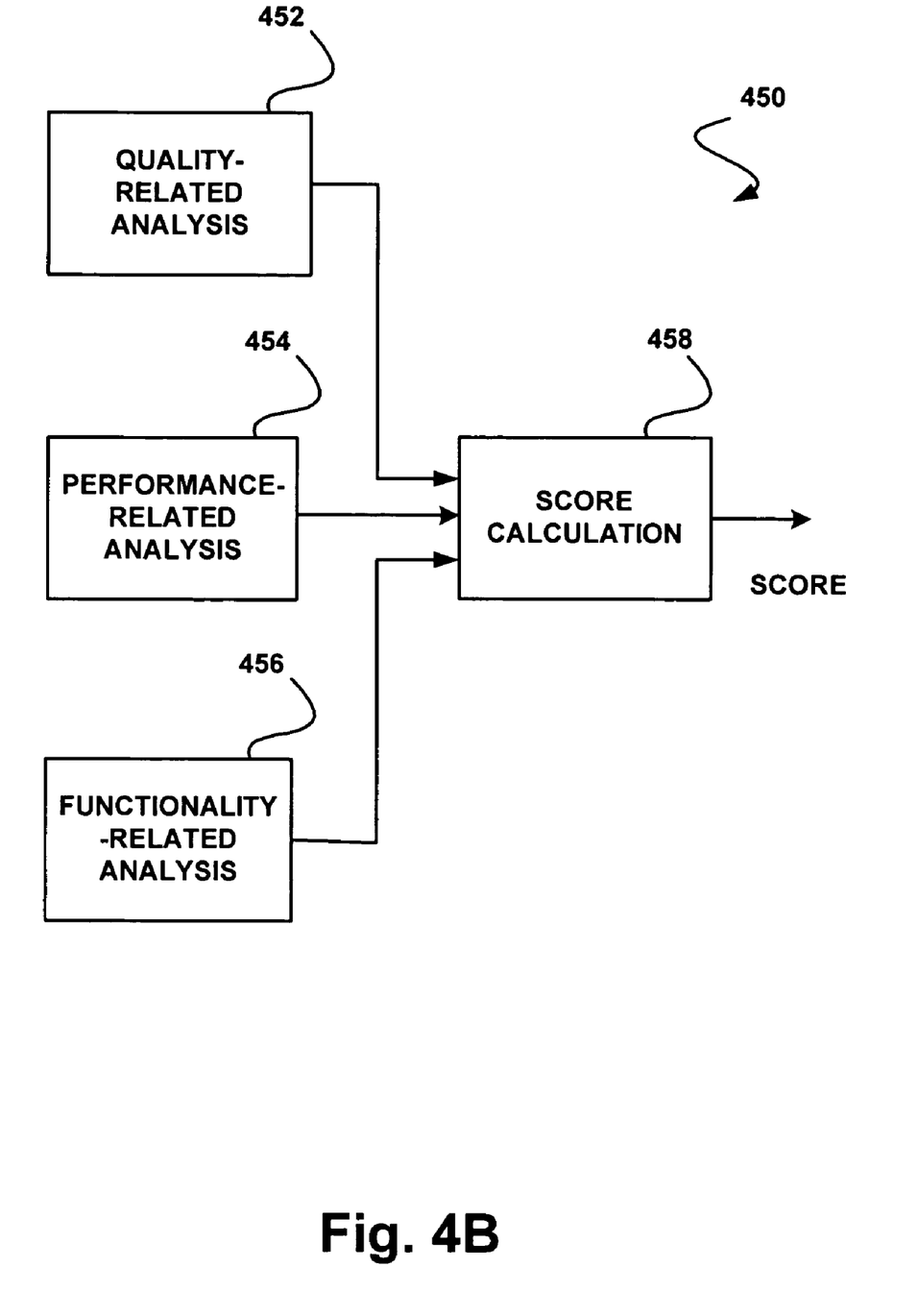
FIG. 4B shows a system for video benchmarking based on an analysis of video processing performance, functionality, and quality, in accordance with yet another embodiment.

FIG. 4B shows a system 450 for video benchmarking based on an analysis of video processing performance, functionality, and quality, in accordance with yet another embodiment. As an option, the present system 450 may be implemented in combination with or separate from the method 100 of FIG. 1 and/or the various embodiments of other previous figures. Of course, however, the system 450 may be implemented in any desired environment. Again, the previous definitions apply in the context of the description of the present figure.

As shown, the system 450 provides a multifaceted approach for comprehensively gauging video processing capabilities of a processor which may or may not be a component of a system, etc. Such multiple facets may, in one embodiment, not only include the quality-related benchmarking aspects mentioned during the description of the previous figures, but may also include other facets of video processing as well. Specifically, in addition to a quality-related analysis 452, both a performance-related analysis 454 and a functionality-related analysis 456 may be used to input one or more results into a score calculator 458 for providing a comprehensive score indicative of video processing performance, functionality, and quality.

In use, the aforementioned quality-related analysis 452 may gauge a detail and/or color of video processing results (e.g. by identifying artifacts, gauging clarity, etc.). Still yet, such quality-related analysis 452 may involve gauging a motion of video processing results (e.g. by gauging clarity, smoothness, etc.). Even still, any flicker may be identified and gauged. In other embodiments, an accuracy of any predictive-based algorithm used during video processing may be tested (e.g. evaluated, assessed, etc.). Of course, these and/or any other quality-related analysis (e.g. see the description of FIGS. 1A-3, etc.) may be employed, for producing a result (e.g. score, etc.) relative to a quality of the video processing.

With respect to the functionality-related analysis 456, such analysis may involve a test for determining which formats may be decoded by the subject processor. Such formats may include, but are not limited to the National Television System Committee (NTSC) format, phase alternating line (PAL) format, Y/C (S-video) format, sequential couleur avec memoire (SECAM) format, high definition television (HDTV) format, Advanced Television Systems Committee (ATSC) format, MPEG format (e.g. MPEG-4, etc.), video codec 1 (VC-1) format, H.264 format, DIVX® format, WINDOWS media video (WMV) format, and/or any other format that video may take for various purposes (e.g. compression, compositing, etc.). Of course, such a test may be performed in any desired manner. Just by way of example, the analysis may simply involve inputting video with a comprehensive set of formats, and identifying which are successfully decoded.

Further, a result (e.g. score, etc.) may be provided which improves as a function of the number of supported formats, as well as support for more important/prevalent formats. In various embodiments, this and any other of the scores to be described herein may be identified by simply utilizing a direct proportional function to correlate the results of the test with the score (e.g. 1 supported format=score of 1, 2 supported formats=score of 2, etc.). In other embodiments, a look up table (similar to those set forth during the description of FIG. 2, etc.) may be used to identify a specific score that corresponds with the specific results of the associated test.

Still yet, in additional embodiments, the functionality-related analysis 456 may involve a test for determining which display resolutions may be supported by the processor. In use, such a test may involve an attempt to drive the processor to display video utilizing a wide range of resolutions. To this end, supported display resolutions may be readily identified. Similar to format support, the present test may output a score that improves as a wider range of display resolutions is supported.

In other embodiments, the functionality-related analysis 456 may involve the identification of a number of streams of video, a number of windows of video, etc. that may be simultaneously supported by the processor. Further, it may be determined whether a recording and playback function may be simultaneously supported. Similarly, the functionality-related analysis 456 may test for simultaneous support for an encoding and decoding operation, or any other sets of functionality, for that matter. Of course, other embodiments are also contemplated for testing for support for solely an encoding operation or solely a decoding operation.

Even still, in other embodiments, the functionality-related analysis 456 may involve determining which post-processing functionality is available. Such post-processing may include, but is not limited to gamma correction, motion estimation or compensation, decompression, color space control, brightness, saturation, color temperature correction, sharpening, overlay processing, scaling, encoding, de-interlacing, up/down scaling, any video filtering, etc. Similarly, the functionality-related analysis 456 may further identify a type of display I/O interface [e.g. digital video interface (DVI), video graphics array (VGA), HDTV, dual head, etc.] that is supported.

In still additional embodiments, the functionality-related analysis 456 may test for anomalies including, but not limited to glitches, frame drops, video tearing, unwanted artifacts, etc. It may also be determined whether audio and video are properly synchronized. Even still, compliance with one or more predetermined standards may be tested, resulting in additional results in the form of scores or the like.

Turning now to the performance-related analysis 454, such analysis may test for power efficiency by comparing a predetermined video processing output and an amount of power consumption required to support such output. Still yet, various sensors may be used to identify an amount of heat generated as a result of predetermined video processing. Of course, as the amount of heat rises, a resultant score may decrease proportionally, etc. In still other embodiments, the processor may run video processing at a maximum rate, after which various aspects (e.g. latency, jitter, etc.) may be assessed and gauged. To this end, a maximum extent of the capabilities of the processor may be identified.

The performance-related analysis 454 may further assess an amount of processing that is offloaded from an associated central processing unit (CPU). For that matter, the performance-related analysis 454 may assess any load balancing capability involving the processor, the CPU, and/or any other system resource. Similar to the heat-related test, a resultant score may decrease proportionally with respect to any decrease in such offloading/load balancing capability.

In the context of such quality-related analysis 452, performance-related analysis 454 and functionality-related analysis 456, any one or more of the aforementioned corresponding aspects may be assessed and gauged in a standardized, automated fashion. For example, if there is more than one score associated with any of the foregoing analyses, such scores may first be aggregated, weighted, etc. in a desired manner. While such analysis-specific scores may be used separately for video benchmarking by themselves, they may also be, in turn, aggregated, weighted, etc. for the purpose of providing a single comprehensive score.

This may be accomplished by feeding the results of each of the foregoing analyses into the score calculator 458 for identifying a cumulative score that takes into account the results of each of the above analyses. In various embodiments, the result of each analysis may range from a single number to a large set of numbers. In some embodiments, the score calculator 458 (which may or may not be similar to that set forth during the description of FIG. 2, etc.) may employ any aggregation, weighting, etc. algorithm.

For instance, if the results of the functionality-related analysis 456 are deemed twice as important as the results of the performance-related analysis 454, the former result may be weighted by a factor of 2, prior to summing (for example) with the other scores. In one embodiment, the aforementioned weighting may be a function of a complexity of post-processing, encoding/decoding, and/or any other processing that improves output quality. In other embodiments, such weighting may be a function of a degree of cost, complexity, and/or difficulty of processing; and/or a degree of cost, quality, and/or complexity of content being processed. By these features, a more comprehensive, multifaceted video benchmarking technique may be provided.

Figure 5:
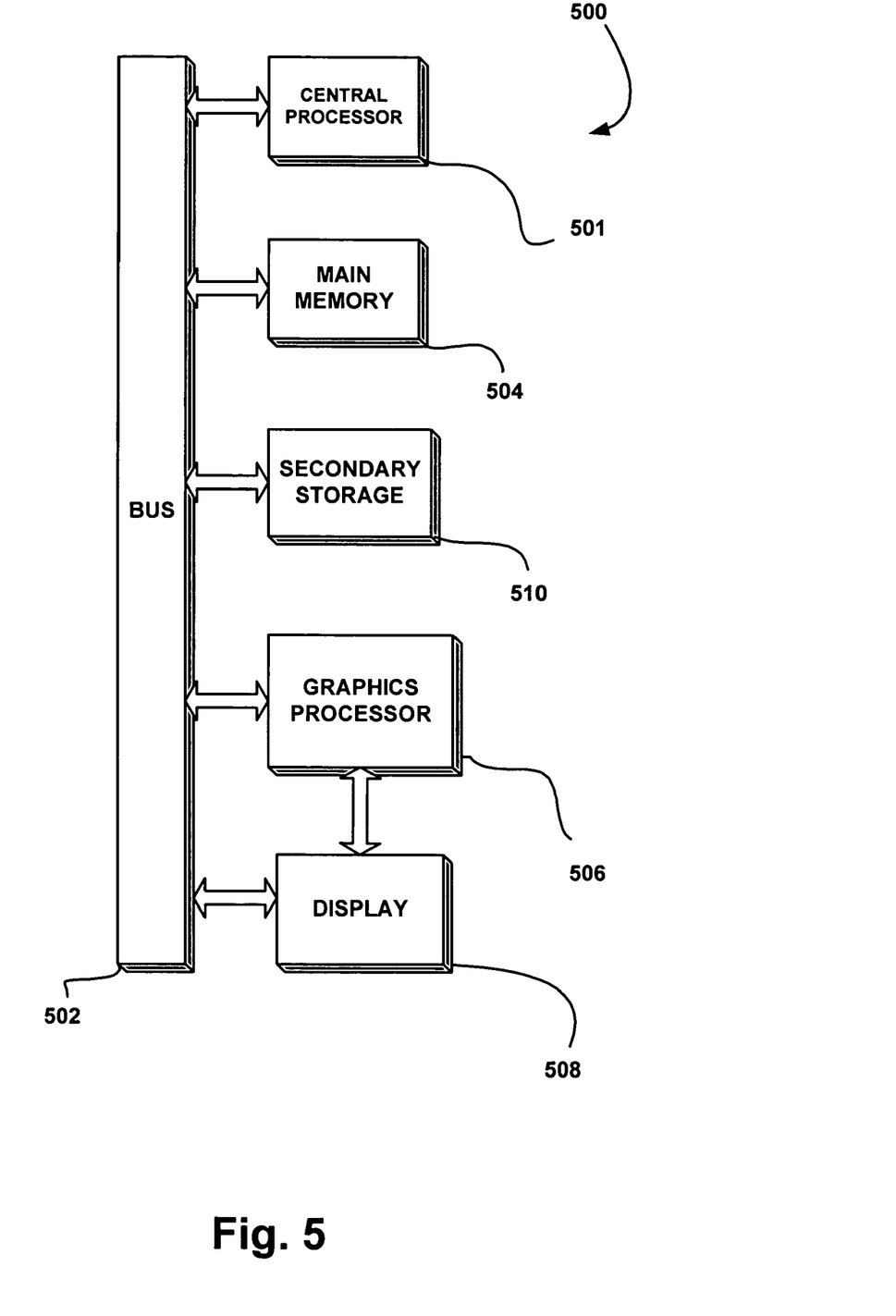
FIG. 5 illustrates an exemplary computer system in which the various architecture and/or functionality of the various previous embodiments may be implemented.

FIG. 5 illustrates an exemplary computer system 500 in which the various architecture and/or functionality of the various previous embodiments may be implemented. As shown, a computer system 500 is provided including one or more host processors 501 which are connected to a communication bus 502. The computer system 500 also includes a main memory 504. Control logic (software) and data are stored in the main memory 504 which may take the form of random access memory (RAM).

The computer system 500 also includes a graphics processor 506 and a display 508, i.e. a computer monitor. In one embodiment, the graphics processor 506 may include a transform module, a lighting module, a rasterization module, a video processing module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The aforementioned qualitative/quantitative aspects of the video processing associated with the graphics processor 506 may be identified in any desired manner. Just by way of example, an unillustrated mechanism may be used to extract information from a frame buffer of the graphics processor 506 by conducting a frame buffer dump and a subsequent analysis, etc. In some embodiments, an external capture device may use a digital video interface (DVI) or video graphics array (VGA) connection for performing an analysis utilizing a separate system, etc. Still yet, software analysis tools may be utilized to run various diagnostics, etc.

Of course, in each of such embodiments, measures may be taken to ensure that such mechanisms do not impact the various aspects (e.g. CPU offloading, etc.) of the processing being gauged. Further, use of such mechanisms may involve an initialization procedure for gauging the video processing without analyzing any particular aspect of the video processing, in order to identify a baseline. To this end, such baseline may be taken into account when subsequently analyzing various aspects of the video processing, for gauging purposes.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

In one embodiment, the architecture and/or functionality of the various previous figures may be implemented in the context of the host processor(s) 501, graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying at least one quantitative aspect of video processing of a processor;
identifying at least one qualitative aspect of the video processing of the processor; and
gauging the video processing of the processor based on the at least one quantitative aspect and the at least one qualitative aspect;
wherein the gauging includes a test associated with an aspect of the video processing selected from the group consisting of color, detail, motion, flicker, and an accuracy of a predictive-based algorithm.

2. The method as recited in claim 1, wherein the processor includes a graphics processor.

3. The method as recited in claim 1, wherein the at least one quantitative aspect of the video processing is identified by processing a stimulus utilizing the processor to generate an output result.

4. The method as recited in claim 3, wherein the stimulus includes at least one of pixel content, frame content, and line content.

5. The method as recited in claim 3, wherein the output result is compared to a reference result to identify a difference.

6. The method as recited in claim 5, wherein the video processing of the processor is gauged as a function of the difference.

7. The method as recited in claim 6, wherein the video processing of the processor is gauged as a function of the difference to identify an error.

8. The method as recited in claim 7, wherein an error and a degree thereof are identified utilizing at least one filter.

9. The method as recited in claim 7, wherein the error relates to an error in the video processing with respect to a portion of display content that was intended to be subject to the video processing.

10. The method as recited in claim 7, wherein the error relates to an error in the video processing with respect to a portion of display content that was not intended to be subject to the video processing.

11. The method as recited in claim 6, wherein the video processing of the processor is gauged as a function of the difference to identify a score.

12. The method as recited in claim 11, wherein the score is identified utilizing a look-up table.

13. The method as recited in claim 11, wherein the output result is further compared to a previous result to identify another score.

14. A method, comprising:
- identifying at least one quantitative aspect of video processing of a processor;
- identifying at least one qualitative aspect of the video processing of the processor; and
- gauging the video processing of the processor based on the at least one quantitative aspect and the at least one qualitative aspect;
- wherein the at least one quantitative aspect of the video processing is identified by processing a stimulus utilizing the processor to generate an output result;
- wherein the output result is compared to a reference result to identify a difference;
- wherein the video processing of the processor is gauged as a function of the difference to identify a score;
- wherein the output result is further compared to a previous result to identify another score;
- wherein the previous result is identified by processing the stimulus utilizing a different processor of a separate system.

15. A method, comprising:
- identifying at least one quantitative aspect of video processing of a processor;
- identifying at least one qualitative aspect of the video processing of the processor; and
- gauging the video processing of the processor based on the at least one quantitative aspect and the at least one qualitative aspect;
- wherein the at least one quantitative aspect of the video processing is identified by processing a stimulus utilizing the processor to generate an output result;
- wherein the output result is compared to a reference result to identify a difference;
- wherein the video processing of the processor is gauged as a function of the difference to identify a score;
- wherein the score is further a function of the at least one qualitative aspect.

16. A method, comprising:
- identifying at least one quantitative aspect of video processing of a processor;
- identifying at least one qualitative aspect of the video processing of the processor; and
- gauging the video processing of the processor based on the at least one quantitative aspect and the at least one qualitative aspect;
- wherein the gauging is adaptable by incorporating results associated with different processors.

17. A computer program product embodied on a computer readable medium, comprising:
- computer code for identifying at least one quantitative aspect of video or audio processing of a processor;
- computer code for identifying at least one qualitative aspect of the video or audio processing of the processor; and
- computer code for gauging the video or audio processing of the processor based on the at least one quantitative aspect and the at least one qualitative aspect;
- wherein the gauging includes a test associated with an aspect of the video processing selected from the group consisting of color, detail, motion, flicker, and an accuracy of a predictive-based algorithm.

18. A system, comprising
- a stimulus for being input to a processor for generating at least one quantitative aspect of video processing of the processor and at least one qualitative aspect of the video processing of the processor;
- wherein the video processing of the processor is gauged based on the at least one quantitative aspect and the at least one qualitative aspect;
- wherein the gauging includes a test associated with an aspect of the video processing selected from the group consisting of color, detail, motion, flicker, and an accuracy of a predictive-based algorithm.

19. The system as recited in claim 18, wherein the processor is in communication with a display and a central processing unit via a bus.

* * * * *